United States Patent [19]
Davies

[11] Patent Number: 5,738,525
[45] Date of Patent: Apr. 14, 1998

[54] CABLE ATTENUATION SIMULATOR FOR TRAINING CATV TECHNICIANS

[75] Inventor: Robert Daniel Davies, Two Harbors, Minn.

[73] Assignee: Versacom, Inc., Littleton, Colo.

[21] Appl. No.: 665,793

[22] Filed: Jun. 18, 1996

[51] Int. Cl.$^6$ ................................................ G09B 19/00
[52] U.S. Cl. ............................ 434/219; 434/224; 434/379;
364/802; 333/166; 380/10; 395/500; 386/99;
348/192
[58] Field of Search ........................................ 434/219, 224,
434/365, 366, 369, 379; 364/802, 578;
327/272, 356, 361; 333/16, 166; 380/7,
10, 13, 16, 20; 348/5.5, 10, 192, 193; 386/99;
395/500; 345/952

[56] References Cited

U.S. PATENT DOCUMENTS

| | | | |
|---|---|---|---|
| 3,631,232 | 12/1971 | Perreault et al. | 364/802 |
| 4,091,550 | 5/1978 | Schrenk et al. | 434/219 X |
| 4,281,925 | 8/1981 | Forrest et al. | |
| 4,760,597 | 7/1988 | Hayes et al. | |
| 4,835,494 | 5/1989 | Preschutti | |
| 4,847,700 | 7/1989 | Freeman | 434/307 R X |
| 5,067,901 | 11/1991 | Fordham et al. | |
| 5,243,651 | 9/1993 | Parikh et al. | |

*Primary Examiner*—Joe Cheng
*Attorney, Agent, or Firm*—Dorr, Carson, Sloan & Birney, P.C.

[57] ABSTRACT

A simulator for simulating the attenuation characteristics of a length of coaxial cable in a cable television (CATV) network employs a diplex filter to separate the CATV signal and AC power into at least two separate signal paths. The AC power path has a resistance selected to simulate the DC loop resistance of the desire length of cable. The CATV signal path is in parallel with the AC power path, and has an attenuation selected to simulate the characteristics of the cable at CATV frequencies. In the preferred embodiment, the simulator is equipped with separate signal paths for the upstream and downstream CATV signals that have attenuations selected to simulate the characteristics of the cable within the frequency bands used for upstream and downstream CATV signals, respectively. The resistor in the AC power path has a sufficiently high power rating to handle realistic AC power levels. In contrast, the components in the upstream and downstream CATV signal paths are required to handle only nominal power levels.

17 Claims, 2 Drawing Sheets

CABLE ATTENUATION SIMULATOR FOR TRAINING CATV TECHNICIANS

BACKGROUND OF THE INVENTION

1. Field of the Invention

The present invention relates generally to the field of simulators for cable television (CATV) technicians. More specifically, the present invention discloses a cable attenuation simulator for training CATV technicians that allows separate attenuation characteristics to be selected for upstream signals, downstream signals, and AC power to simulate an arbitrary length of coaxial cable. The AC power path has a sufficient power-dissipating capacity to handle realistic AC power levels.

2. Statement of the Problem

Coaxial cables used in CATV systems have attenuation characteristics that change with signal frequency. Attenuation generally increases with signal frequency. Therefore, CATV amplifiers and line extenders are commonly equipped with equalization circuitry that technicians must be trained to adjust to compensate for the particular attenuation characteristics of each branch of a CATV network.

One prior art approach has been to build a bread-board simulator that actually incorporates hundreds or thousands of feet of coaxial cable between each component. The cable often must be stored in an adjacent room at the training facility. This approach is needlessly cumbersome, wasteful, and expensive.

Another approach has been to simulate the inductive and resistive characteristics of a selected length of cable in a bread-board simulator by inserting an inductor, resistor, and capacitor. For example, Scientific Atlanta has marketed an in-line compensator that uses a resistor, inductor, and capacitor to simulate different lengths of cable. This approach has two significant shortcomings. A single resistor and inductor cannot accurately simulate the attenuation characteristics of a coaxial cable over a wide range of frequencies. CATV networks commonly carry downstream signals from the headend to the subscribers in the frequency range of about 50 to 750 MHz, upstream signals from subscribers to the headend in the frequency range of about 5 to 45 MHz, and AC power at about 60 Hz to operate the line amplifiers along the CATV network. As a result, a CATV network can exhibit a wide variety of attenuation characteristics depending on the frequency range of interest. Second, the Scientific Atlanta in-line compensator is incapable of handling AC power levels commonly carried in CATV systems to power the line amplifiers along the coaxial cable. Proper equalization of the CATV network by the technician must ensure that each line amplifier receives sufficient AC power for operation. The Scientific Atlanta compensator can only be used to equalize networks at CATV frequencies with only nominal power, but not for realistic AC power levels.

The prior art also includes the following related inventions:

| Inventor | U.S. Pat. No. | Issue Date |
| --- | --- | --- |
| Parikh et al. | 5,243,651 | Sept. 7, 1993 |
| Fordham et al. | 5,067,901 | Nov. 26, 1991 |
| Preschutti | 4,835,494 | May 30, 1989 |
| Hayes et al. | 4,760,597 | July 26, 1988 |
| Forrest et al. | 4,281,925 | Aug. 4, 1981 |

Parikh et al. disclose a CATV interdiction system that disables the TV signal to the subscriber's TV and pulses an LED to indicate diagnostic codes.

Fordham et al. show a microcomputer system for simulating a multimeter. The simulator uses digital input signals in place of actual high voltage signals to train technicians.

Preschutti discloses an automatic gain control system for balancing losses in a coaxial CATV network. The headend includes an equalizer 212 with a fixed loss and a "variable cable simulator" circuit 213 with an adjustable loss. An AGC circuit 250 monitors the strength of the pilot signal received at the repeater 220 and adjusts the simulator circuit 213 so that the sum of the losses provided by the cable, equalizer 212, and simulator circuit 213 match the fixed gain of the repeater 220. In short, the "variable cable simulator" circuit 213 is merely an attenuator with an adjustable loss.

Hayes et al. show a technician set-up unit for installing and assigning addresses for CATV converters.

Forrest et al. show an attenuation simulator for fiber optic cables.

3. Solution to the Problem

None of the prior art references uncovered in the search show a cable attenuation simulator that is capable of simulating both the high and low frequency characteristics of an arbitrary length of coaxial cable. In addition, the present invention employs a separate low-frequency signal path that has sufficient power-dissipating capacity to handle the AC power. The signal path for high-frequency CATV signals can use relatively low-power, inexpensive components. In the preferred embodiment, the present invention has three separate signal paths for AC power, the downstream CATV signal, and upstream CATV signal. Separate attenuation characteristics can be selected for each signal path.

SUMMARY OF THE INVENTION

This invention provides a simulator for simulating the attenuation characteristics of a length of coaxial cable in a cable television (CATV) network. A diplex filter separates the CATV signal and AC power into at least two separate signal paths. The AC power path has a resistance selected to simulate the DC loop resistance of the desire length of cable. The CATV signal path has an attenuation selected to simulate the characteristics of the cable at CATV frequencies. In the preferred embodiment, the simulator is equipped with separate signal paths for the upstream and downstream CATV signals that have attenuations selected to simulate the characteristics of the cable within the frequency bands used for upstream and downstream CATV signals, respectively. The resistor in the AC power path has a sufficiently high power rating to handle realistic AC power levels. In contrast, the components in the upstream and downstream CATV signal paths are required to handle only nominal power levels.

A primary object of the present invention is to provide a simulator that can simulate the attenuation characteristics of a length of coaxial cable at both CATV frequencies and AC voltages.

Another object of the present invention is to provide a simulator capable of handling AC power levels commonly found in actual CATV networks.

Yet another object of the present invention is to provide a simulator that can accurately simulate the attenuation characteristics of a length of coaxial cable for both upstream and downstream CATV signals.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
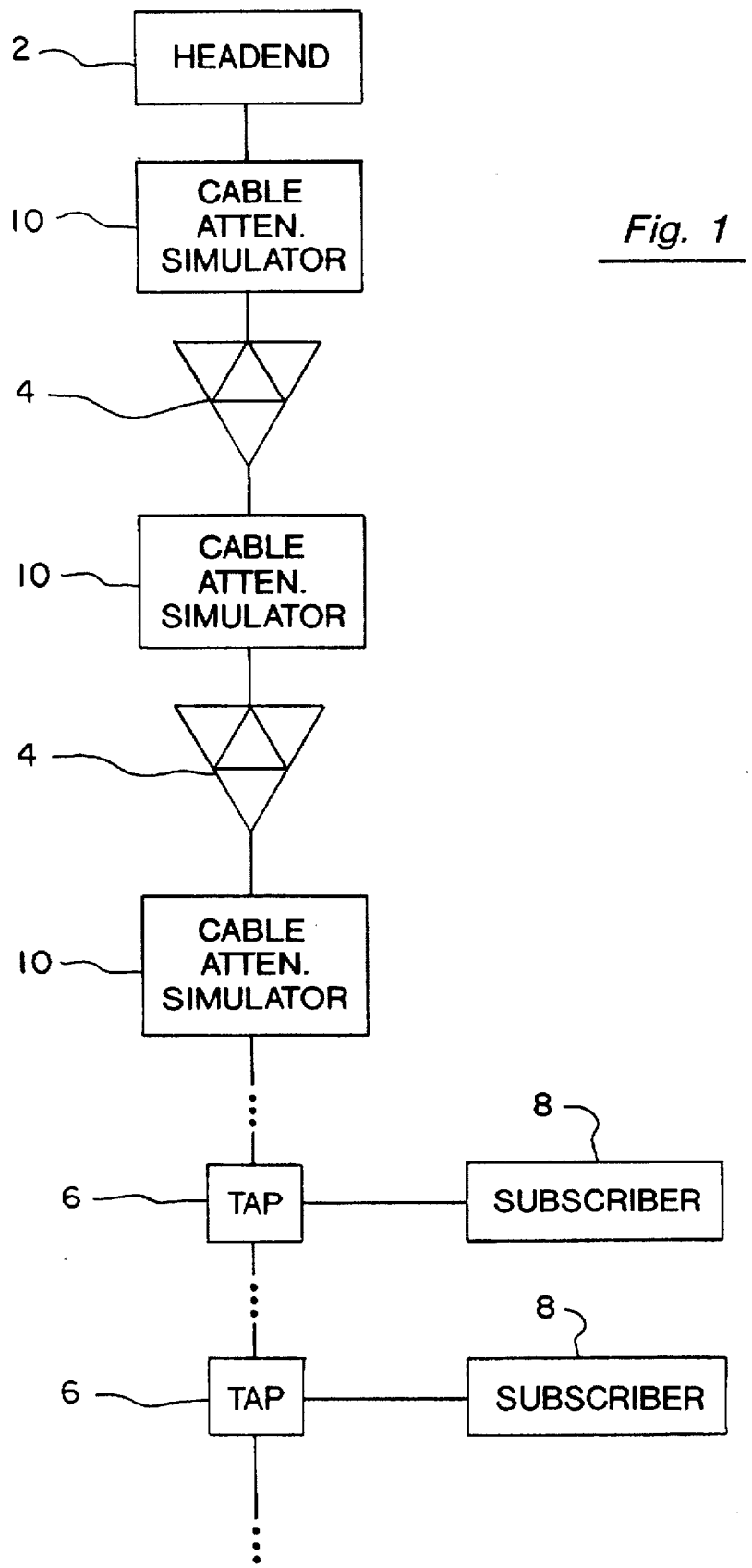
FIG. 1 is a schematic block diagram of a bread-board simulation of a typical CATV network showing the manner in which the present simulator 10 is inserted to simulate a desired length of coaxial cable.
Figure 2:
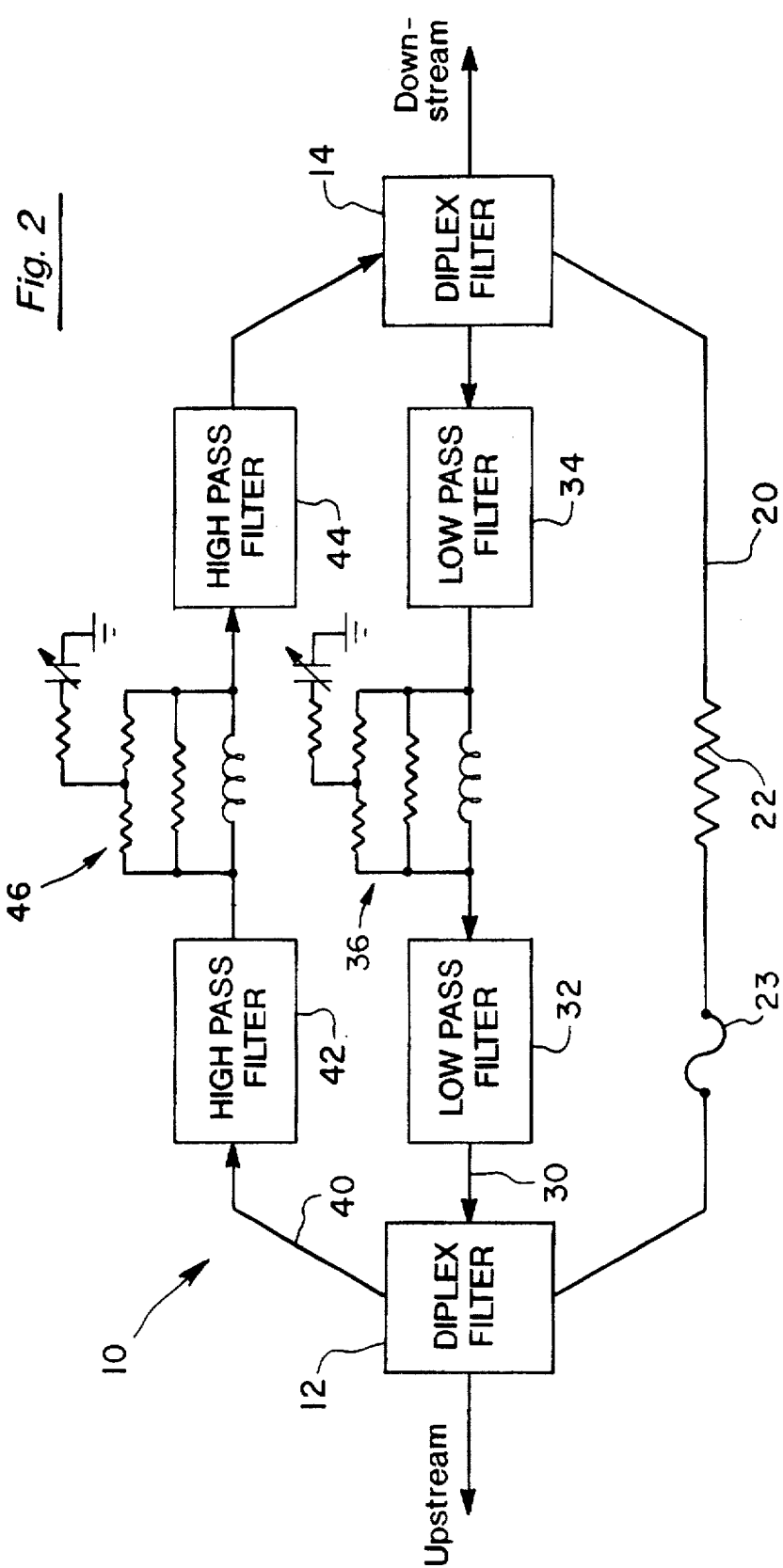
FIG. 2 is a schematic diagram of the simulator circuitry 10.

Turning to FIG. 1, a block diagram is provided showing a typical bread-board simulation of a CATV network used to train technicians. An actual CATV network would include various lengths of coaxial cable between components that are replaced in the bread-board simulation by the cable attenuation simulator 10. FIG. 2 is a schematic block diagram of the circuitry for the cable attenuation simulator 10. As illustrated in FIG. 1, a CATV network typically includes arbitrary lengths of coaxial cable between the active components. The headend 2 serves as the source for television programming that is transmitted downstream over the CATV network to subscribers 8. Conventional CATV networks transmit downstream signals in the frequency band of approximately 50 MHz to 750 MHz. Many CATV networks also permit communications in the upstream direction from subscribers 8 to the headend 2. Upstream communications are typically in the frequency band of approximately 5 MHz to 45 MHz. For example, upstream communications can be used for telephone service, allowing the subscriber to select and request optional cable services (e.g., pay-per-view channels), or other services requiring a telecommunications link with the subscriber (e.g., home security monitoring).

Line amplifiers 4 (or repeaters) are used to boost signal strength in both the upstream and downstream directions to compensate for signal attenuation along the coaxial cable. Cable attenuation increases as a function of frequency. Therefore, line amplifiers 4 are generally equipped with equalization circuitry that compensates for the frequency-dependent attenuation characteristics of the coaxial cable. Ideally, the amplitude of the signal delivered to each tap 6 and subscriber unit 8 along the CATV network should be maintained within prescribed limits over the entire frequency spectrum. This normally requires extensive manual adjustment of the equalizers for each line amplifier by a technician to compensate for the specific attenuation characteristics of the network.

This has created the need for educational facilities to train CATV technicians in a classroom setting. It is impractical to train students using an actual cable system, due to the inconvenience and possible interruption of cable service to subscribers, as well as the large distances between components in the field. Therefore, bread-board simulations of cable systems are often used in a classroom setting to train students to become CATV technicians. These bread-board simulations employ actual components (e.g., line amplifiers 4, taps 6, and subscriber units 8) that can be easily rearranged and interconnected in various configurations to model actual cable networks. One example of a simple cable network configuration is illustrated in FIG. 1. The present cable attenuation simulator 10 can be connected between other components to simulate the attenuation characteristics of a desired length of coaxial cable.

Each cable attenuation simulator 10 is packaged in a small modular box with two external electrical connectors or ports that enable the cable attenuation simulator to be readily wired into the larger bread-board simulation of the cable network. This modularity makes it easy to simulate virtually any length of coaxial cable. For example, cable attenuation simulators 10 can be made for common cable lengths, such as 250, 500, 750, 1000, and 1500 meters. The appropriate combination of cable attenuation simulators using these standard lengths can be connected in series to simulate any length of coaxial cable. Alternatively, the cable attenuation simulator can be equipped with adjustable attenuation networks in each signal path to allow the user to manually adjust these values for different lengths of coaxial cable.

The simulator 10 includes two diplex filters 12, 14 that separate the upstream and downstream signals into a plurality of parallel signal paths 20, 30, and 40 within the simulator 10, as illustrated in FIG. 2. Each diplex filter separates incoming signals received via its external network port into at least two separate signal paths, and conversely combines signals received from the multiple signal paths into a single outgoing signal at the external port.

Very low frequency signals (i.e., below about 120 Hz) are routed along the AC power path 20, which is equipped with a resistor 22 having a high power dissipation rating (e.g., about 10 to 50 watts, and preferable about 25 watts). The resistor has a value selected to match the DC loop resistance of the desired length of coaxial cable at very low frequencies. The DC loop resistance is defined as the DC resistance between the conductor and surrounding sheath for the length of cable. A fuse 23 protects the AC power path 20 from being overloaded if the current accidentally exceeds the resistor's power rating.

The diplex filters 12 and 14 also direct CATV signals (i.e., in the range of about 5 to 42 MHz and 50 to 750 MHz) along a number of CATV signal paths 30, 40. The CATV signals have very low power and can be handled using standard electronic components with nominal power ratings. In the preferred embodiment, CATV signal path is implemented as two separate, parallel signal paths 30 and 40 for the upstream CATV signal band (i.e., 5 to 45 MHz) and downstream CATV signal (i.e., 50 to 750 MHz), respectively. A conventional diplex filter normally provides only two signal paths. A third signal path can be created by tapping into the high-frequency signal path within the diplex filter immediately behind the output capacitor leading to the high-frequency signal port. This implementation results in three parallel signal paths (AC power 20, upstream CATV 30, and downstream CATV 40) extending in parallel between the diplex filters 12 and 14, as shown in FIG. 2. In particular, each diplex filter 12, 14 has a port that is connected to the external CATV network, and three ports for the AC power path 20, upstream CATV signal path 30, and downstream CATV signal path 40, respectively. Additional signal paths could be added between these three sets of ports by including appropriate bandpass filters in each path.

The upstream CATV signal path 30 includes two low-pass filters 32, 34 that further limit the range of frequencies carried by the upstream signal path 30. An attenuation network 36 of resistors, inductors, and capacitors provides the desired attenuation for the upstream signal. The attenuation network 36 can be made with fixed-value components to simulate a fixed length of coaxial cable, or can be made with variable components to allow simulation of a range of cable lengths. The attenuation network 36 components require only nominal power ratings because the diplex filters 12, 14 and the bandpass filters 32, 34 exclude the AC power signal from the upstream CATV signal path 30.

Similarly, the downstream CATV signal path 40 includes two high-pass filters 42, 44 to limit the range of frequencies carried by the downstream signal path 40, and in particular to exclude the AC power signal. A second attenuation network 46 of resistors, inductors and capacitors provides the desired attenuation for downstream CATV signals. Here again, the attenuation network 46 components require only nominal power ratings because the diplex filters 12, 14 and the high pass filters 42, 44 exclude the AC power signal from the downstream CATV signal path 40.

The above disclosure sets forth a number of embodiments of the present invention. Other arrangements or embodiments, not precisely set forth, could be practiced under the teachings of the present invention and as set forth in the following claims.

I claim:

1. A simulator for simulating the attenuation characteristics of a length of cable in a cable television (CATV) network carrying CATV signals and a low-frequency AC voltage, said simulator comprising:
   an AC power path having a resistance selected to simulate the DC loop resistance of said cable;
   at least one CATV signal path in parallel with said AC power path having an attenuation selected to simulate said cable at CATV frequencies; and
   filter means for separating signals by frequency between said AC power path and said CATV signal path.

2. The simulator of claim 1 wherein said CATV signal path comprises at least two parallel CATV signal paths for upstream CATV signals in a first frequency band and downstream CATV signals in a second frequency band, respectively; and wherein said filter means separates said CATV signals between said upstream CATV signal path and said downstream CATV signal path.

3. The simulator of claim 1 wherein said AC power path comprises a resistor having a power rating in the range of about 10 to 50 watts.

4. The simulator of claim 1 wherein said filter means comprise a diplex filter.

5. The simulator of claim 1 wherein said filter means comprise two diplex filters with said signal paths extending in parallel between said diplex filters.

6. The simulator of claim 1 wherein said CATV signal path further comprises a high-pass filter to exclude said AC voltage.

7. A simulator for simulating the attenuation characteristics of a length of cable in a cable television (CATV) network carrying downstream CATV signals in a first frequency band from a headend to subscriber units, upstream CATV signals in second frequency band from said subscriber units to said headend, and a low-frequency AC voltage, said simulator comprising:
   an AC power path having a resistance selected to simulate the DC loop resistance of said cable;
   a downstream CATV signal path in parallel with said AC power path having an attenuation selected to simulate said cable in said downstream CATV frequency band;
   an upstream CATV signal path in parallel with said AC power path having an attenuation selected to simulate said cable in said upstream CATV frequency band; and
   filter means for separating signals by frequency between said AC power path, said downstream CATV signal path, and said upstream CATV signal path.

8. The simulator of claim 7 wherein said upstream CATV signal path is in parallel with said downstream CATV signal path.

9. The simulator of claim 7 further comprising said AC power path comprises a resistor having a power rating in the range of about 10 to 50 watts.

10. The simulator of claim 7 wherein said filter means comprise a diplex filter.

11. The simulator of claim 7 wherein said filter means comprise two diplex filters with said signal paths extending in parallel between said diplex filters.

12. The simulator of claim 7 wherein said upstream CATV signal path further comprises a bandpass filter to exclude said AC voltage and said downstream CATV signal.

13. The simulator of claim 7 wherein said downstream CATV signal path further comprises a high-pass filter to exclude said AC voltage and said upstream CATV signal.

14. A simulator for simulating the attenuation characteristics of a length of cable in a cable television (CATV) network carrying downstream CATV signals in a first frequency band from a headend to subscriber units, upstream CATV signals in second frequency band from said subscriber units to said headend, and a low-frequency AC voltage, said simulator comprising:
   a first diplex filter for separating signals into predetermined frequency bands corresponding to said AC voltage, upstream CATV signals, and downstream CATV signals; said first diplex filter having:
   (a) a network port for communicating with said CATV network;
   (b) an AC power port for communicating said AC voltage;
   (c) an upstream CATV signal port for communicating said upstream CATV signals; and
   (d) a downstream CATV signal port for communicating said downstream CATV signals;
   a second diplex filter for separating signals into predetermined frequency bands corresponding to said AC voltage, upstream CATV signals, and downstream CATV signals; said second diplex filter having:
   (a) a network port for communicating with said CATV network;
   (b) an AC power port for communicating said AC voltage;
   (c) an upstream CATV signal port for communicating said upstream CATV signals; and
   (d) a downstream CATV signal port for communicating said downstream CATV signals;
   an AC power path having a resistance selected to simulate the DC loop resistance of said cable, said AC power path extending between said AC power ports of said first and second diplex filters;
   a downstream CATV signal path extending between said downstream CATV signal ports of said first and second diplex filters, said downstream CATV signal path having an attenuation selected to simulate said cable in said downstream CATV frequency band; and
   an upstream CATV signal path extending between said upstream CATV signal ports of said first and second diplex filters, said upstream CATV signal path having an attenuation selected to simulate said cable in said upstream CATV frequency band.

15. The simulator of claim 14 wherein said upstream CATV signal path further comprises a bandpass filter to exclude said AC voltage and said downstream CATV signal.

16. The simulator of claim 14 wherein said downstream CATV signal path further comprises a high-pass filter to exclude said AC voltage and said upstream CATV signal.

17. The simulator of claim 14 wherein said AC power path comprises a resistor having a power rating in the range of about 10 to 50 watts.

* * * * *